(12) United States Patent
Wei

(10) Patent No.: US 7,999,804 B2
(45) Date of Patent: Aug. 16, 2011

(54) MONITOR

(75) Inventor: Gang Wei, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 785 days.

(21) Appl. No.: 12/057,362

(22) Filed: Mar. 27, 2008

(65) Prior Publication Data

US 2009/0164808 A1 Jun. 25, 2009

(30) Foreign Application Priority Data

Dec. 19, 2007 (CN) .......................... 2007 1 0203212

(51) Int. Cl.
*G06F 3/038* (2006.01)

(52) U.S. Cl. .................... 345/212; 345/211; 345/213

(58) Field of Classification Search .......... 345/211–213, 345/204
See application file for complete search history.

(56) References Cited

U.S. PATENT DOCUMENTS

| 5,703,629 A * | 12/1997 | Mermelstein et al. ........ 345/213 |
| 2005/0212789 A1 * | 9/2005 | Kim .............................. 345/204 |
| 2006/0164325 A1 * | 7/2006 | Ford et al. ...................... 345/1.1 |

* cited by examiner

*Primary Examiner* — Amare Mengistu
*Assistant Examiner* — Koosha Sharifi-Tafreshi
(74) *Attorney, Agent, or Firm* — Altis Law Group, Inc.

(57) ABSTRACT

A monitor includes a display device, a signal interface, a power interface, and a power controller. The display device is configured for displaying information to users. The signal interface is configured for receiving display signals, and providing the display signals for the display device. The power interface is configured for receiving power from an external power source, and providing the source for the display device. The power controller monitors the existence of the display signal at the signal interface, and accordingly controls the power interface to selectively provide the power for the display device.

5 Claims, 6 Drawing Sheets

MONITOR

BACKGROUND

1. Field of the Invention

The present invention generally relates to monitors. Particularly, the present invention relates to a monitor, which is able to cut off power supplied thereto when there is no display signal.

2. Description of Related Art

Computers, media players and other electronic devices display information to users on monitors. A typical monitor includes a signal interface for receiving display signals and a power interface for receiving power. Typically, when there is no display signal supplied to the monitor, the monitor displays a dark screen or message like "no signal".

During the time no display signal is sent to the monitor, the monitor is still active and ready to display which wastes power and further ages the components therein Therefore, a need exists in the industry to provide a monitor which is able to cut off the power supplied thereto when there is no display signal.

SUMMARY

In one embodiment, a monitor includes a display device, a signal interface, a power interface, and a power controller. The display device is configured for displaying information to users. The signal interface is configured for receiving display signals, and providing the display signals to the display device. The power interface is configured for receiving power from an external power source, and providing power to the display device. The power controller monitors the existence of the display signal at the signal interface, and accordingly controls the power interface to selectively provide the power to the display device.

Other advantages and novel features of the monitor will become more apparent from the following detailed description of embodiments when taken in conjunction with the accompanying drawings, in which:

DETAILED DESCRIPTION

Figure 1:
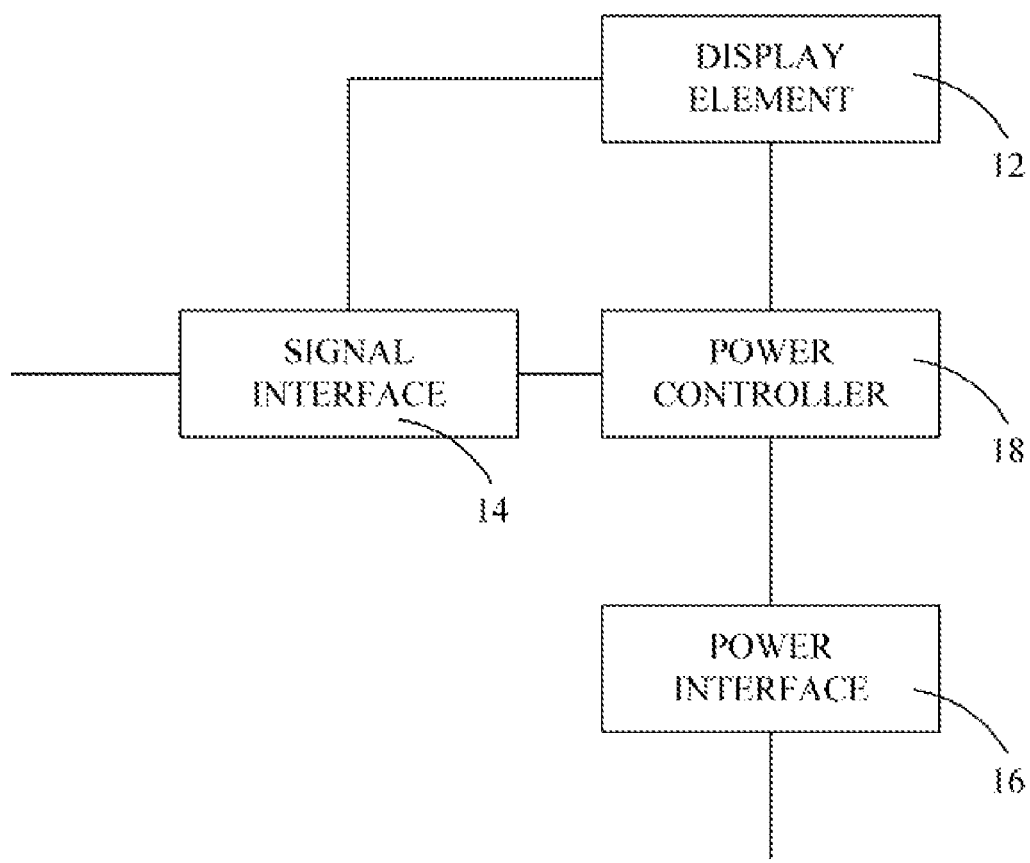
FIG. 1 is a block diagram of a monitor in accordance with an exemplary embodiment; the monitor including a signal interface and a power controller.

Referring to FIG. 1, a monitor in accordance with an exemplary embodiment includes a display device 12, a signal interface 14, a power interface 16, and a power controller 18.

The display device 12 is configured for displaying information to users, such as interfaces of operation systems installed in the computer, interfaces of application software, images, documents, and movies. The display device 12 can be a traditional Cathode Ray Tube (CRT), Liquid Crystal Display (LCD), or Plasma Display Panel (PDP), etc.

Figure 2:
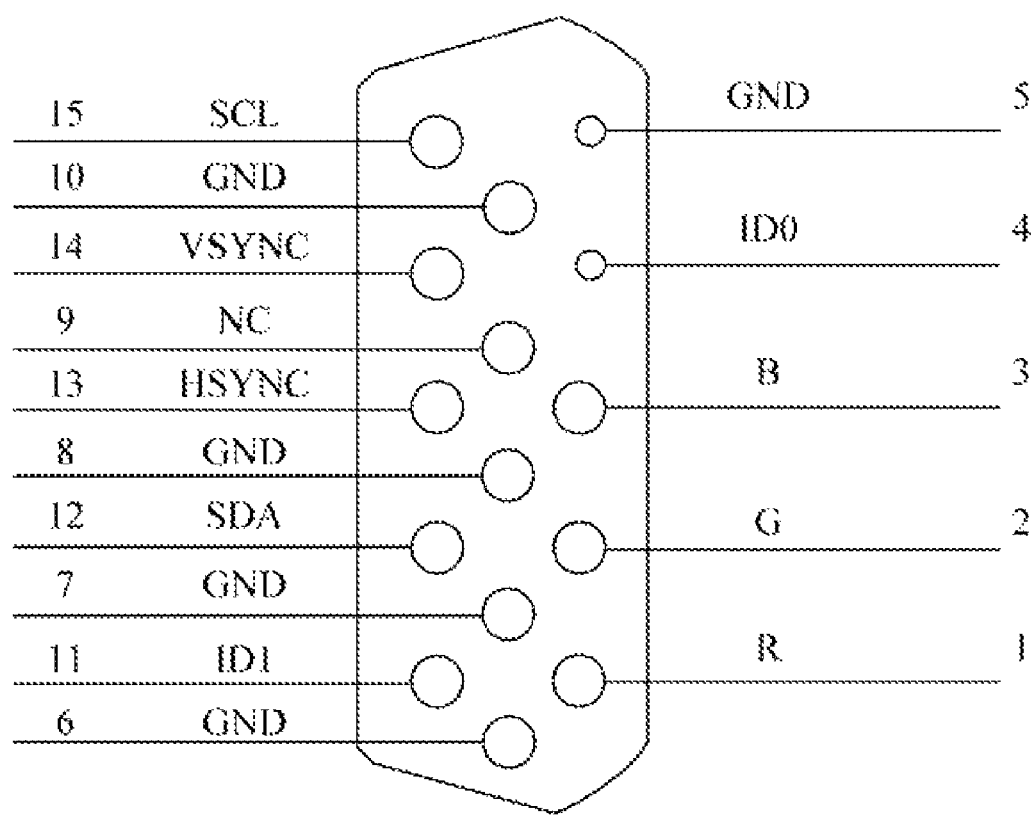
FIG. 2 is a schematic diagram of the signal interface of FIG. 1 in the case that the signal interface is a video graphic array, the signal interface having a power pin.
Figure 3:
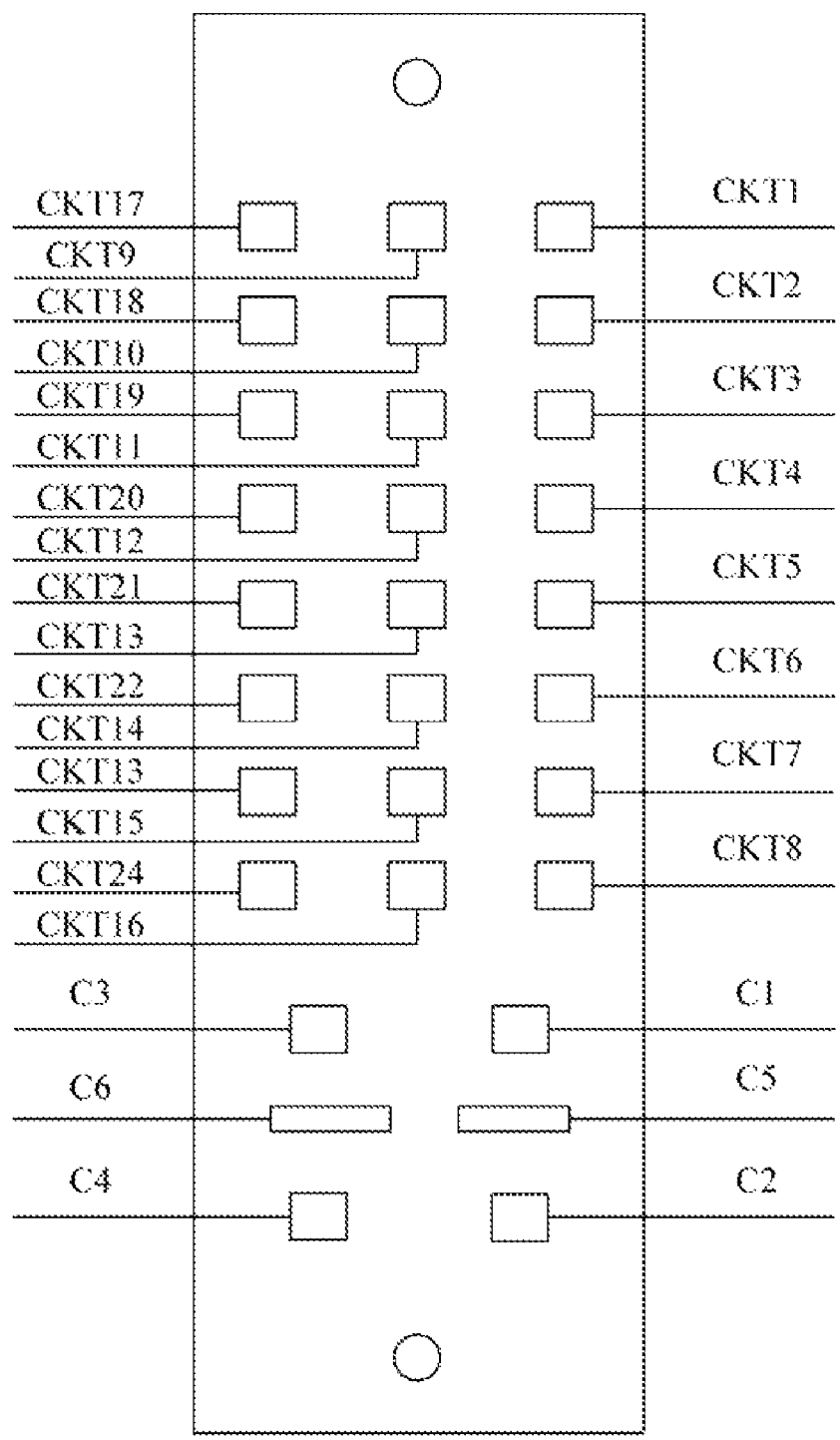
FIG. 3 is a schematic diagram of the signal interface of FIG. 1 in the case that the signal interface is a digital video interface, the signal interface having a power pin.

Referring to FIGS. 2 and 3, the signal interface 14 is configured for receiving display signals from signal sources such as computers or media players. The signal interface 14 can be a Video Graphic Array (VGA) (as shown in FIG. 2) used for transmitting analog signals, a Digital Video Interface (DVI) (as shown in FIG. 3), or a High Definition Multimedia Interface (HDMI) used for transmitting digital signals.

Referring to FIG. 2, in the case that the signal interface 14 is the VGA interface, the signal interface 14 has a power pin indicating the presence of the display signal. In the VGA interface, the power pin is the 9th pin NC. Referring to FIG. 3, the CLK 14 pin in the DVI interface is also a power pin. The power signal at the power pin of the signal interface 14 is 5V when the display signal is present, zero otherwise.

The power interface 16 is configured for being connected to an external power source such as an 110V alternating current (AC) power source, and converting the external voltage to a suitable form for use by the monitor, if necessary.

The power controller 18 is configured for monitoring the presence of the display signal, and controlling the power interface 16 to selectively provide the power supply to the display device 12. In the case that the signal interface 14 receives a display signal, the power controller 18 allows the power interface 16 to provide the power supply to the display device 12, otherwise, the power controller 18 cuts off the power supply.

Figure 4:
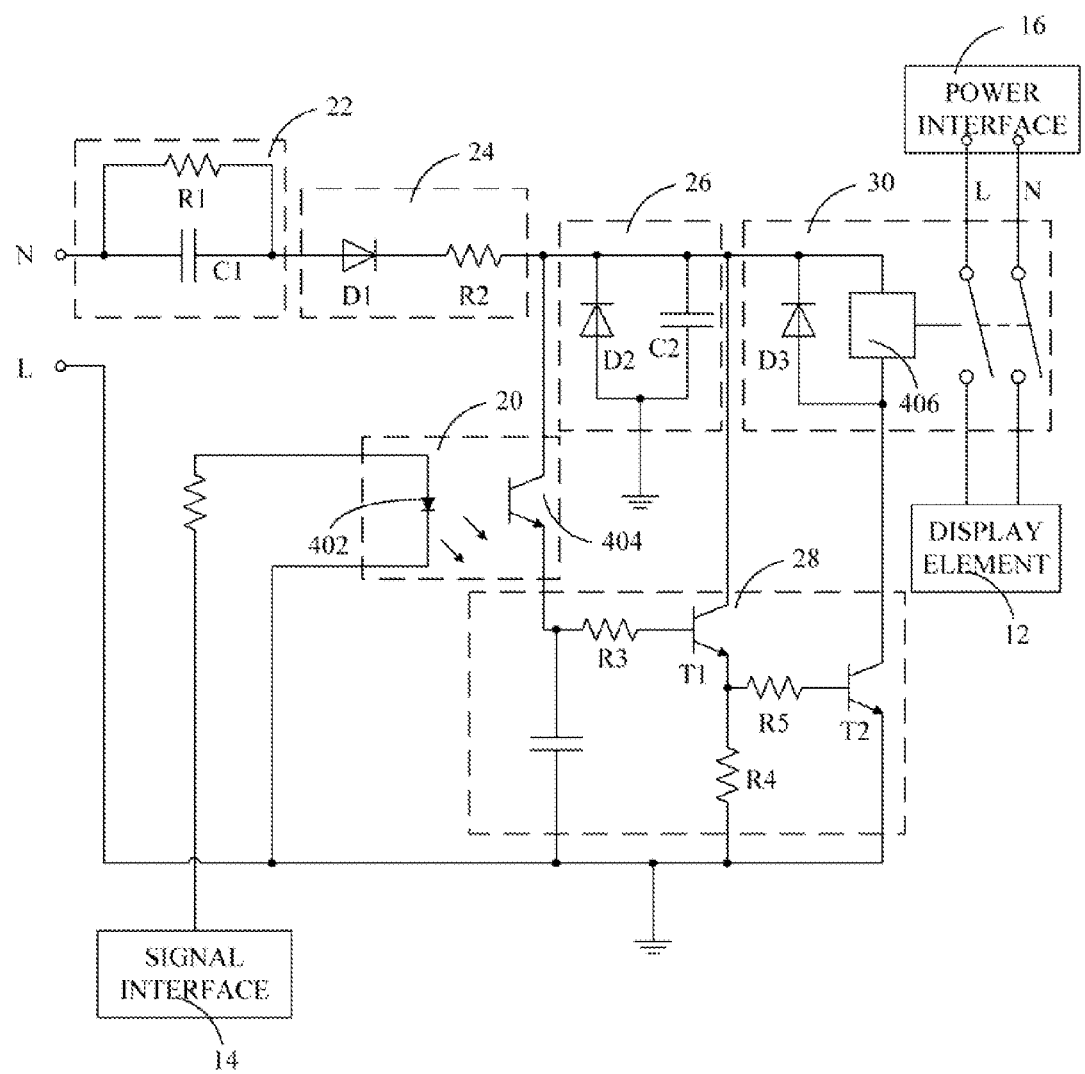
FIG. 4 is a schematic diagram of the power controller of FIG. 1.

Referring to FIG. 4, the power controller 18 includes a first switch circuit 20, a filter circuit 22, a damping circuit 24, a rectifying circuit 26, an amplifying circuit 28, and a second switch circuit 30.

The first switch circuit 20 is configured for receiving the power signal from the power pin of the signal interface 14, and generating a first switch signal according to the power signal. The first switch circuit 20 may be a 4N28 photocoupler. The first switch circuit 20 includes a light emitting diode (LED) 402 and a phototransistor 404. The power signal received from the power pin of the signal interface 14 turns on the LED 402. Light emitted by the LED 402 strikes the phototransistor 404, causing the phototransistor 404 to become conductive, and generating the first switch signal.

The filter circuit 22 receives the power provided by the power interface 16, and filters ripples in the power, thus avoiding sudden spikes in power to the elements. In this embodiment, the filter circuit 22 includes a capacitor C1 and a resistor R1. The capacitor C1 and the resistor R1 are connected in parallel, and then connected to the neutral wire N of the external power source. The filtered power is transmitted to the damping circuit 24.

The damping circuit 24 is configured for absorbing induced voltages in the power controller 18, thereby avoiding sudden spikes in voltage to elements in the circuit. The damping circuit 24 includes a diode D1 and a resistor R2. The anode of the diode D1 is connected to the output end of the filter circuit 22, the cathode of the diode D1 is connected to one end of the resistor R2. The other end of the resistor R2 is connected to the rectifying circuit 26, and is also connected to the collector of the phototransistor 404.

The rectifying circuit 26 is configured for filtering high-frequency components in the power provided by the external power source, thereby avoiding signal distortion in following circuits. The rectifying circuit 26 includes a diode D2 and a capacitor C2. The anode of the diode D2 is connected to the cathode of the capacitor C2, and further connected to ground, while the cathode of the diode D2 is connected to the anode of the capacitor C2, and further connected to the output end of the damping circuit 24.

The amplifying circuit 28 is connected to the emitter of the phototransistor 404 of the first switch circuit 20, for amplifying the first switch signal. The amplifying circuit 28 includes two cascaded transistors T1 and T2. Both of the transistors T1 and T2 are NPN type. The base of the transistor T1 is connected to the emitter of the phototransistor 404 of the first switch circuit 20 through a resistor R3, for receiving the first switch signal. The collector of the transistor T1 is connected to the output end of the rectifying circuit 26. The emitter of the transistor T1 is connected to ground through a resistor R4. The emitter of the transistor T1 is also connected to the base of the transistor T2 through a resistor R5. The emitter of the transistor T2 is connected to ground. The collector of the transistor T2 is connected to the rectifying circuit 26 through the second switch circuit 30. Therefore, the first switch signal can be used for controlling the on/off state of the second switch circuit after being amplified by the amplifying circuit 28.

The second switch circuit 30 is configured for connecting or cutting off the power supplied to the display device 12 according to the amplified signal of the amplifying circuit 28. The second switch circuit 30 includes an electromagnetic relay 406 and a diode D3. The anode of the diode D3 is connected to the collector of the transistor T2 of the amplifying circuit 28, and the cathode thereof is connected to the output end of the rectifying circuit 26. The diode D3 is able to conduct the two ends of the electromagnetic relay 406, thereby protecting the electromagnetic relay 406 in the case that the electromagnetic relay 406 is powered off and generates a rather high negative voltage.

Figure 5:
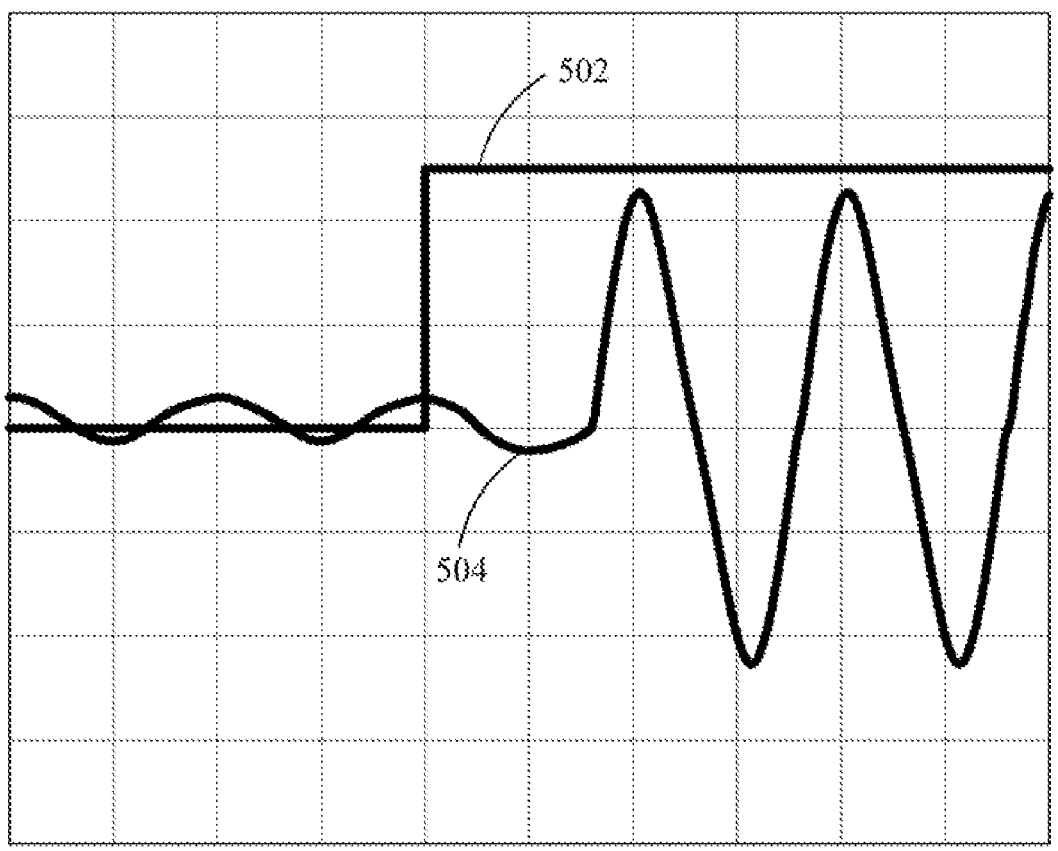
FIG. 5 illustrates wave forms of the power signal at the power pin and the power received by the display device in the power-on situation.
Figure 6:
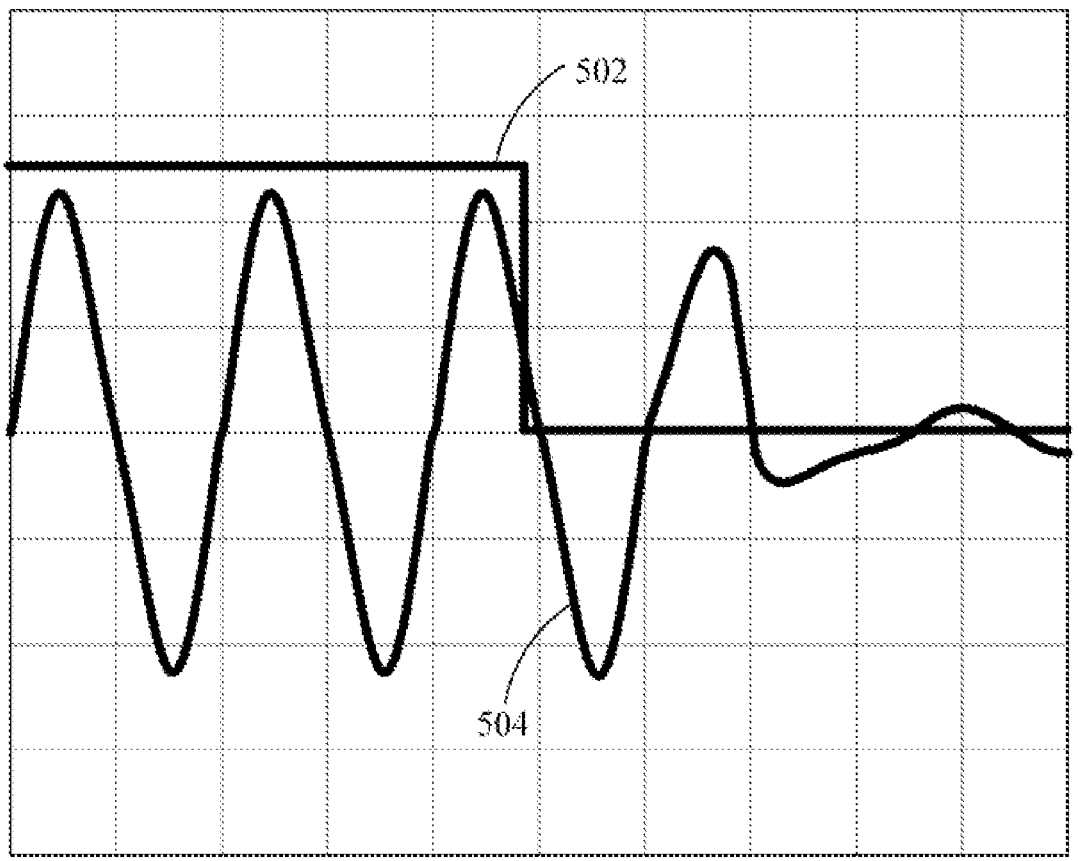
FIG. 6 illustrates wave forms of the power signal at the power pin and the power received by the display device in the power-off situation.

Referring to FIGS. 5 and 6, symbol 502 refers to the wave form of the power signal on the power pin of the signal interface 14, and symbol 504 refers to the wave form of the power that the display device 12 receives. When the power signal on the power pin of the signal interface 14 is 0V, the LED 402 does not emit light, therefore the phototransistor 404 is not conductive. The first switch circuit 20 therefore generates the first switch signal with a low voltage. The transistors T1 and T2 are not conductive accordingly, and the electromagnetic relay 406 is not conducted. Therefore, the power received by the power interface 16 cannot be provided to the display device 12. When the power signal on the power pin of the signal interface 14 is 5V, the LED 402 emits light to the phototransistor 404. The phototransistor 404 is conductive, and sends out the first switch signal with a high voltage. The high voltage first switch signal causes the transistors T1 and T2 of the amplifying circuit 28 to be conductive. Therefore, the electromagnetic relay 406 is conducted, and the power introduced by the power interface 16 can be provided to the display device 12.

The embodiment was chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A monitor comprising:
    a display device for displaying information to users;
    a signal interface for receiving display signals, and providing the display signals for the display device;
    a power interface for receiving power from an external power source, and providing the power for the display device; and
    a power controller monitoring the existence of the display signal at the signal interface, and accordingly controlling the power interface to selectively provide the power for the display device, wherein the power controller comprises:
        a first switch circuit for generating a first switch signal according to the existence of the display signal at the signal interface;
        an amplifying circuit for amplifying the first switch signal and generating an amplified signal; and
        a second switch circuit for switching on or off the connection between the power interface and the display device according to the amplified signal.

2. The monitor as described in claim 1, wherein the signal interface is video graphic array, digital video interface, or high definition multimedia interface.

3. The monitor as described in claim 1, wherein the first switch circuit comprises:
    a light emitting diode driven by a power signal on a power pin of the signal interface; and
    a phototransistor receiving the light emitted by the light emitting diode, and being conductive to generate the first switch signal.

4. The monitor as described in claim 1, wherein the amplifying circuit comprises two cascaded transistors.

5. The monitor as described in claim 1, wherein the second switch circuit comprises an electromagnetic relay connected to the amplifying circuit and driven by the amplified signal, for being conducted according to the amplified signal, therefore selectively connecting the power interface with the display device.

* * * * *